Jan. 30, 1934.   D. DAPONTE   1,945,029
OPTICAL LIGHT DIVIDING SYSTEM
Filed Jan. 8, 1930   2 Sheets-Sheet 1

T-552

INVENTOR
Demetre Daponte
BY
Nathan & Bowman
ATTORNEYS

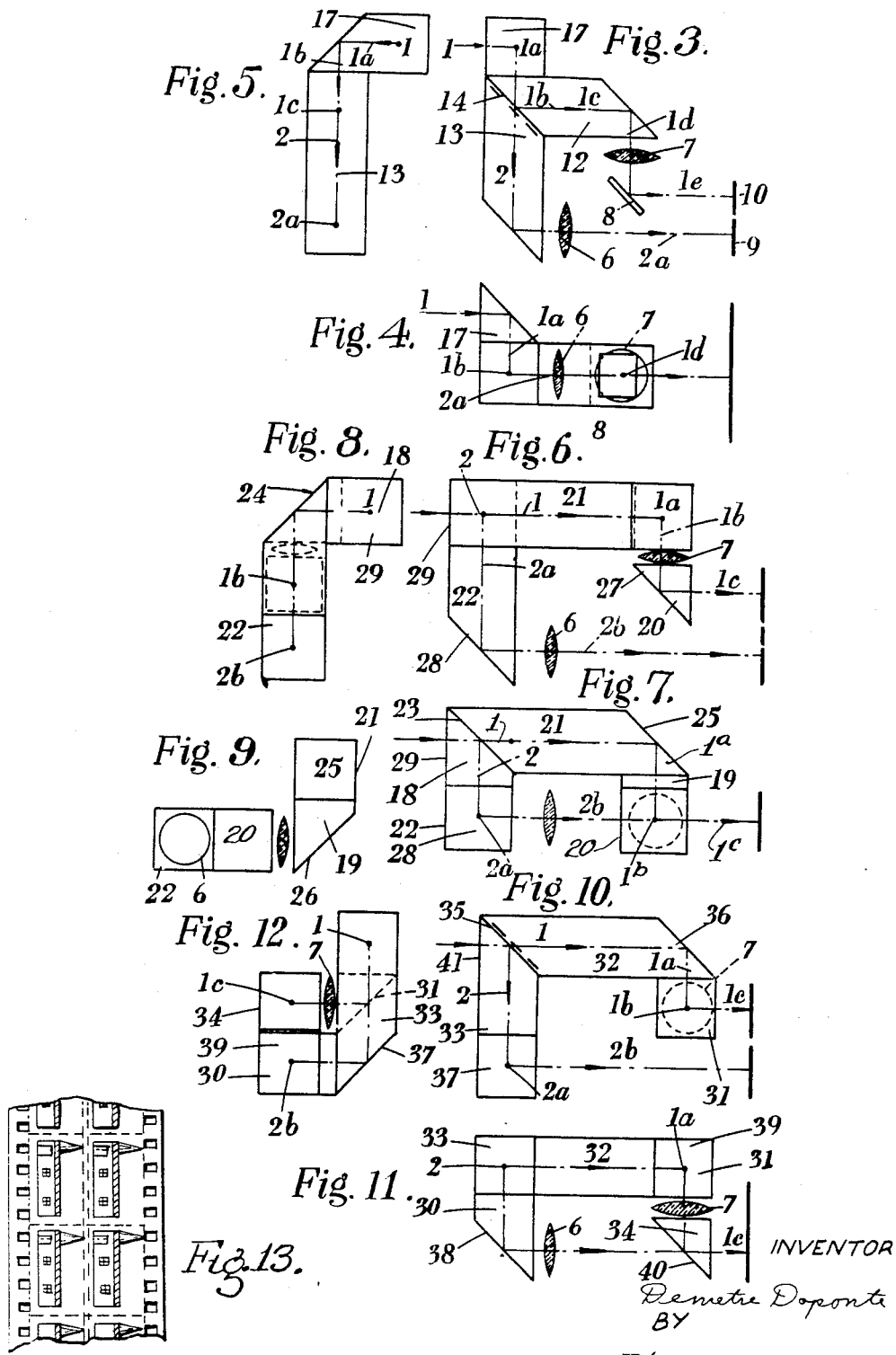

Patented Jan. 30, 1934

1,945,029

UNITED STATES PATENT OFFICE 1,945,029

OPTICAL LIGHT DIVIDING SYSTEM

Demetre Daponte, London, England, assignor to Cinecolor Company of America, Inc., New York, N. Y., a corporation of Delaware Application January 8, 1930, Serial No. 419,294, and in Great Britain April 12, 1929

4 Claims. (Cl. 88—1)

The present invention relates to a light dividing system for use in the production of cinematographic effects in colour by which the synthetic colour pictures are taken simultaneously from the same point (aspect) of view, such pictures being subsequently projected by suitable apparatus on to the screen simultaneously in register with each other, so that the spectator has not to rely upon persistence of vision for the blending of colours.

By this apparatus there may be formed at each exposure through appropriate colour filters two pictures simultaneously from the same point (aspect) of view alongside each other across the width of the film so as together to occupy the picture area usually occupied by a single picture but turned through 90° so that the two pictures are disposed on the film on their side with respect to the direction of the length of the film, but upright with respect to the direction of the width of the film.

Such a negative film may be made through colour filters in an ordinary camera provided with an optical system suited to cast two such colour images simultaneously from the same point (aspect) of view on the sensitive film at each exposure, and positive film made from such negative film may be projected through colour filters by an ordinary projector provided with an optical system suited to superimpose and cast the corresponding pairs of images, turned to the normal position, or in correct orientation in register upon the screen.

Optical systems hitherto proposed for casting two such colour images simultaneously on the standard width negative film have been open to the objection that lenses of the desired short focus and wide aperture cannot be used. Systems which have permitted the use of short focus lenses have not allowed the desired width of aperture while systems which are adapted for large aperture lenses have been unsuitable for lenses of short focus.

In the first of such systems it is found difficult (using standard film 35m/m wide) to use a lens of greater aperture ratio than f/3.5 with a short focus lens of 1¼ inches (32m/m) and a corresponding smaller aperture ratio with lenses of longer focus. In the second type of system it is generally not practical to use lenses of shorter focus than about 60mm. and f/3 focal aperture for such focal length.

In practice it is desirable to use lenses of about 35mm. focus and f/2 focal aperture, which corresponds to a lens of about 50mm. focus for a normal sized picture, which is common practice.

The system according to the present invention enables such short focus and large aperture lenses to be used and it permits the ratio of focus to picture size of the reduced images to be approximately the same as the ratio of focus to picture size of a normal sized picture, or in other words, the magnification is approximately the same as for pictures of normal size.

An ordinary camera may be used to take the pictures horizontally instead of vertically and an optical system is employed so arranged as to divide the image forming beam into two beams and form on the film at each successive exposure two identical pictures simultaneously which occupy the usual picture area of a standard black and white film but are turned through 90° with respect to images taken in the ordinary way.

These images are taken through appropriate colour screens which may be in or on or travelling with the film itself or may be stationary or rotating screens in known or approved manner.

Or, otherwise, the camera may be kept upright according to the general practice with the ordinary camera, in which case, the optical system is so constructed as itself to turn the two side by side images through 90° to dispose these upright with repect to the direction of the width of the film instead of to the direction of the length of the film.

The length of path of the divided beams may be controlled so as to obtain two substantially identical images capable of giving good registration of the corresponding positive images when these are superimposed on the screen.

In order that the present invention may be the more clearly understood reference is hereinafter made to the constructional examples illustrated in the accompanying drawings, in which:—

Figures 3, 4 and 5 are respectively plan, side, and front elevations of another modified form of combined prism and lens system under the invention.

Figures 6, 7, 8 and 9 are respectively plan, side, front and rear elevations of another modification, Fig. 8 being turned through 90° in a clockwise direction.

Figs. 10, 11, and 12 are respectively plan, side and front elevations of another construction.

Fig. 13 is a view of a piece of film showing how the images are formed alongside one another across the width of the film but disposed with their width along the end of the film.

In referring to the various examples shown in the accompanying drawings the path of the main beam is represented by 1, 1a, etc., and the path of the divided or branch beam is represented by 2, 2a, etc., and where the path of the beam folds so as to continue at right angles to the plane of the paper such folded path is represented by a small spot representing the end on aspect of the path after so folding.

Figure 1:
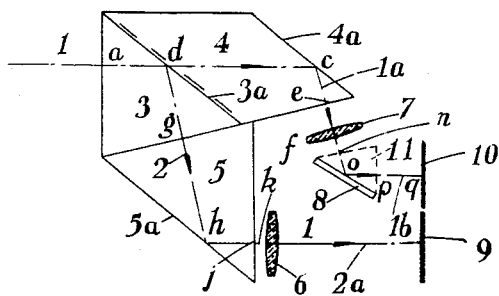
Fig. 1 is a side elevation of a combined prism and lens system constructed according to the present invention.

Fig. 1 shows one form of taking system according to the present invention which consists of a prism consisting of three components 3, 4 and 5 cemented together. The surface 3a of prism 3 is arranged to reflect a certain proportion of the light received and transmit the remainder in a known manner, i. e., either by coating the surface with alternate silvered strips and clear spaces, or preferably by a uniform deposit of silver (or other reflecting agent) such as a reflect and transmit the light in the required proportion. The reflected or branch beam 2 passes on to the prism 5 where it is reflected by the surface 5a in a direction 2a parallel to the path 1 of the incident or main beam, and is received by the lens 6, which forms one of the pair of pictures. The main or transmitted beam passes on to the prism 4 and is reflected by the surface 4a at an angle as required to obtain a proper correction for the system, as hereinafter described. The light then follows the path 1a and passes on to the lens 7 and is reflected along the path 1b which is conveniently made parallel to 2a by a mirror or prism 8 (preferably a mirror) so placed as to give the required separation of the pair of pictures.

The dimensions of the prism are such that the optical path from the point (d) where the main beam is divided, to the lenses 6 and 7 is exactly equal in both beams i. e., the optical path length a, d, c, e, f is exactly equal to the optical path length a, d, g, h, j, k, In this way both lenses are in effect at exactly the same optical distance from the object being photographed, while at the same time both lenses 6 and 7 are so placed in conjunction with the mirror or prism 8 that they both form their respective images 9 and 10 in the same plane and at the required separation.

This condition may be expressed as follows:—
If $\mu_A$ is the mean refractive index of the prism 3 for the light required to be transmitted (i. e. for the wavelength corresponding to the mean transmission of the colour filter which will be used in the beam).

$\mu_b$ is the corresponding refractive index for the prism 4, and $\mu_c$ is the corresponding refractive index for the prism 5, then the dimensions of the prisms must be such that:—

$$\frac{adg}{\mu_A} + \frac{ghj}{\mu_C} + jk = \frac{ad}{\mu_A} + \frac{dce}{\mu_B} + ef.$$

The distances adg, dce and ghj being the linear length of paths of the light in the respective prisms 3, 4 and 5 and the distances jk and ef being the distances from the prism to the first principal planes of the lenses 6 and 7.

The mirror 8 may be a surface silvered or metal reflector, in this case the linear distance from the lenses to the focal plane will be made exactly equal, but instead of a mirror a prism 11 may be used and in this case the linear distance of the lens 7 will be such that:—

$$fn + \frac{nop}{\mu d} + pq = F_1$$

where fn is the distance from the second principal plane of the lens 7 to the surface of the prism, nop is the linear length of path through the prism and pq is the distance from the end or egress surface of the prism to the focal plane, and F is the distance from the second principal plane of the lens 6 to the focal plane.

The prisms 3 and 4 must be material of the same refractive index, but the prisms 5 and 11 may be material of a similar or different refractive index as convenient to secure the required condition.

In the following examples the prisms would be suitably designed in accordance with the foregoing conditions and such designing will present no difficulty to the optical expert.

Figure 2:
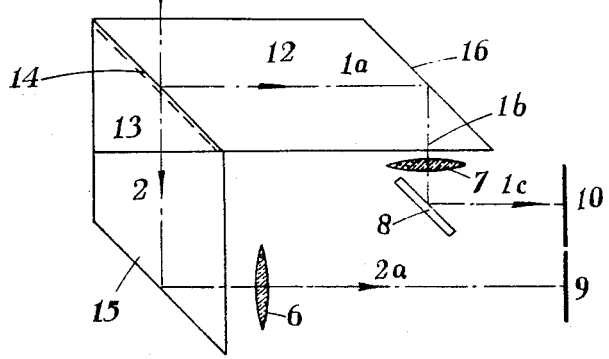
Fig. 2 is a side elevation of a modified form of Fig. 1.

This form of prism may also be constructed so that the incident beam is received in the direction of the reflected beam adgh as shown in Fig. 2. The light falling normally on the face of admission enters the prism 12 and is incident on the reflecting surfaces 14, 15 and 16, conveniently at an angle of 45°, being partially reflected and partially transmitted at 13 to give a folded path 1, 1a, 1b to the main beam and a folded path 2, 2a to the branch beam. The main beam is received by the lens 7 whence it passes on to the mirror 8 to be folded at the required separation parallel to the branch beam after it has been folded to pass through the lens 6.

Both these forms of prisms require that the film should travel in a horizontal direction instead of the usual vertical direction, but the prism may also be constructed so that the images are correctly disposed when the film is vertical and one such prism is shown in Fig. 3 in which a prism similar to Fig. 1 or Fig. 2 is used with the addition of an erecting prism of known form.

In the construction according to Figs. 3 to 5 prisms 12 and 13, lenses 6 and 7, and mirror 8 are employed similar to those in Fig. 2, and with these is combined an erecting prism 17 of known form such that the path of the main beam is:—1, 1a, 1b, 1c, 1d, and 1e to the focal plane, while the path of the branch beam after this is divided at the partially transmitting and partially reflecting surface 14 is 2 and 2a to the focal plane.

In Figs. 3 and 5, the spot indicated paths 1a in Fig. 3 and 1, 1c, and 2a in Fig. 5 are away from the observer, while those marked 1b and 1d in Fig. 4 are towards the observer.

In another form of prism, erection of the images is brought about in the construction of the prism and such a form is shown in Fig. 7, in which the prism-lens system consists of five components, four cemented together, viz., the right-angled prisms 18, 19 and the prism blocks 21, 22 and a spaced right-angled prism 20 which provide a partially transmitting and partially reflecting surface 23, and reflecting surfaces 24, 25, 26 and 28 such that the light falling on the face of admission 29 enters the prism 18 and is incident on the reflecting surfaces above referred to conveniently at an angle of 45°. It is partially reflected and partially transmitted at 23, the main beam passing straight through the prism block 21 (path 1) until it reaches the reflecting face 25 whence it is reflected (path 1a) to the reflecting face 26, from which it is reflected by path 1b through the lens 7 on to the reflecting face 27 of the prism block 20, and then by way of path 1c on to the screen. The branch beam is reflected by the partially reflecting face 23 by path 2 on to the reflecting face 24, thence by path 2a to reflecting face 28 whence it is reflected through lens 6 by path 2b to the focal plane.

In Figs. 6 to 8, the spot indicated paths 1a and 2 in Fig. 6, and 1, 1b and 2b in Fig. 8 are away from the observer, and those marked 2a and 1a in Fig. 7 are towards the observer.

Figs. 10, 11 and 12 show a modified form of prism constructed to bring about the erection of the images and consists of five components, four cemented together, viz., the rectangular prisms 30 and 31 and the prism blocks 32 and 33 and a spaced rectangular prism 34 which provide a partially transmitting and partially reflecting surface 35, and reflecting surfaces 36, 37, 38, 39 and 40 such that the light falling on the face of admission 41, enters the prism block 33 and is incident on the reflecting surfaces above referred to conveniently at an angle of 45°. It is partially reflected and partially transmitted at 35 so that the main beam has a folded path, 1, 1a, 1b, 1c, through the lens 7 to the focal plane by the reflecting surfaces 36, 39 and 40, and the branch beam has a folded path 2, 2a and 2b through the lens 6 to the focal plane by the reflecting surfaces 37 and 38.

In Figs. 10 to 12, the spot indicated paths 1b and 2a in Fig. 10, and 1 and 2b in Fig. 12 are away from the observer, while those marked 1a and 2 in Fig. 11 and 1c in Fig. 12 are towards the observer.

The prism system in Figs. 6 to 12 differ mainly from those in Figs. 1 and 2 by the provision of an additional angularly disposed reflecting surface for the main beam and another for the branch beam, such additional reflecting surface being angularly set in well known way with respect to the preceding reflector and before the lens to turn the images through the required angle.

It is to be observed that all reflecting surfaces are silvered when the critical angle is exceeded.

Where I speak of prism components cemented together it is to be understood that where practical any two or more components may be constituted by one piece.

What I claim is:—

1. In a taking system for receiving images from the same aspect and casting them side by side on a film with the width or horizontal lines of each picture running along or parallel to the length of the film, a light beam divider comprising a partially transmitting and partially reflecting optical element for dividing an incident beam into two component beams making an angle with each other; an objective for each of said component beams, at least one of said objectives being disposed so as to lie in angular relationship with the film; an optical reflector before each of the objectives for bringing the diverging component beams towards each other, said reflectors being positioned so as to permit a separation of the component beams substantially greater than the distance between the parallel axes of the side by side pictures on the film; and a single optical reflector between said angularly disposed objective and the film, said reflector being angularly set with respect to said objective and the film so as to reflect light from the objective on to the film substantially normal to the picture area.

2. In a taking system for receiving images from the same aspect and casting them side by side on a film with the width or horizontal lines of each picture running along or parallel to the length of the film, a light beam divider comprising a partially light-transmitting and partially light-reflecting optical element for dividing an incident beam into two component beams making an angle with each other; an objective for each component beam; a plurality of relatively angularly disposed optical reflectors arranged before said objectives and co-operating to turn the images through 90°; certain of said reflectors serving to bring the diverging component beams towards each other after the component beams have separated over a distance greater than the distance between the parallel axes of the side by side pictures on the film; at least one of said objectives being angularly disposed with respect to the film and transmitting the component beam passing therethrough to the focal plane by way of a single optical reflection.

3. In a taking system for receiving images from the same aspect and casting them side by side on a film with the width or horizontal lines of each picture running along or parallel to the length of the film, a composite light beam dividing prism comprising a partially light-transmitting and partially light-reflecting surface for dividing an incident beam into two component beams making an angle with each other; said prism having reflecting faces for bringing the diverging component beams towards each other after said beams have separated over a distance greater than the distance between the parallel axes of the side by side pictures on the film; objectives to receive the component beams reflected from said reflecting faces; at least one of said objectives being disposed so as to lie in angular relationship with the focal plane; and an optical reflecting element angularly arranged with respect to said angularly disposed objective and the focal plane and lying therebetween so that the component beam transmitted by said angularly disposed objective is reflected by a single reflection on to the focal plane.

4. In a taking system for receiving images from the same aspect and casting them side by side on a film with the width or horizontal lines of each picture running along or parallel to the length of the film, a composite light-beam-dividing prism comprising a partially light-transmitting and partially light-reflecting surface for dividing an incident beam into two component beams making an angle with each other; said prism having reflecting faces for bringing the diverging component beams towards each other after said beams have separated over a distance greater than the distance between the parallel axes of the side by side pictures on the film; objectives to receive the component beams reflected from said reflecting faces; the elements of said prism having their refractive indices predetermined so that the lengths of the paths of the component beams to the objectives are optically equal; and at least one of said objectives being angularly disposed with respect to the focal plane and transmitting the component beam passing therethrough to the focal plane by way of a single optical reflection.

DEMETRE DAPONTE.